United States Patent Office 2,890,448
Patented June 9, 1959

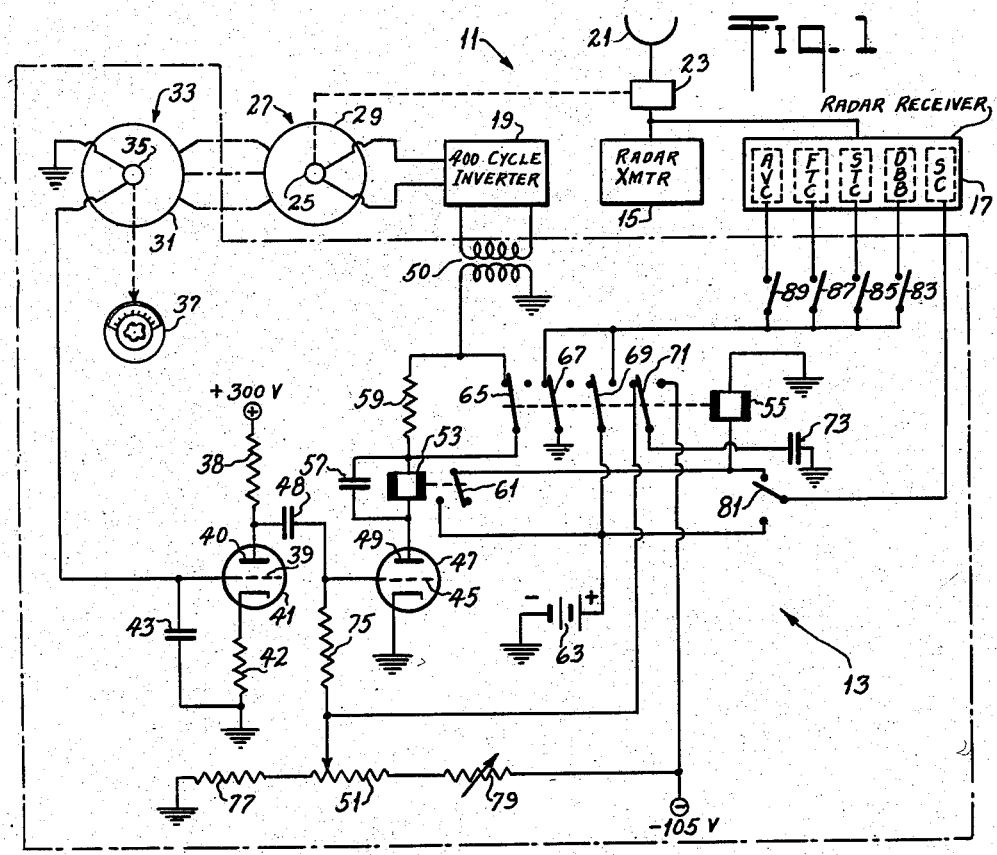
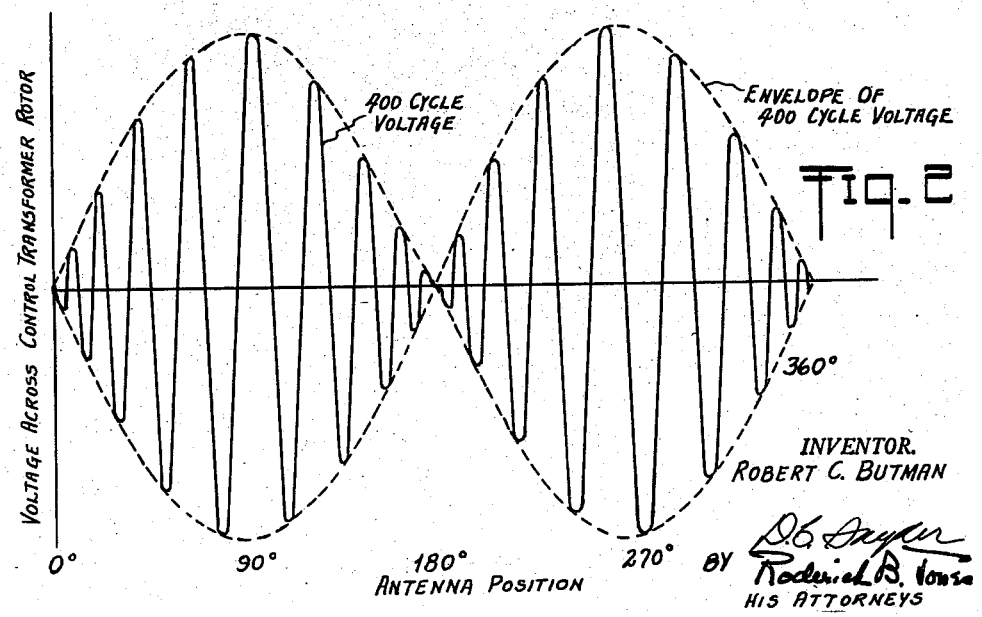

2,890,448

SECTOR SELECTOR

Robert C. Butman, Concord, Mass.

Application October 14, 1952, Serial No. 314,758

2 Claims. (Cl. 343—5)

(Granted under Title 35, U.S. Code (1952), sec. 266)

The invention described herein may be manufactured and used by or for the Government of the United States of America for governmental purposes without the payment of any royalties thereon or therefor.

In the operation of some types of search radar, in which a directive beam of ultrahigh frequency is scanned through a given sector, which may be equal to 360 degrees or any predetermined portion thereof, special circuits have been employed to minimize interference with normal operation of the radar due to reception of undesired signals, thereby to enhance the reception of echoes reflected from targets. Included among the circuits that have been used are (1) fast time constant circuits (FTC); (2) detector balanced bias circuits (DBB); and (3) instantaneous automatic volume control (IAVC) each of which is especially designed to overcome the harmful effects of "clutter," which is the term used to designate reflections from the sea, mountains, buildings, and dense and extended clouds. These circuits also minimize the deleterious effects of electronic and mechanical jamming.

Other auxiliary circuits in use with such search radars are so-called sensitivity time control circuits (STC) varying the gain of the receiver so as to cause targets of the same effective area to appear on the screen of an oscilloscope with the same intensity regardless of the distance of the target from the observer, and slow scan circuits (SC) for reducing the speed of scan thereby to increase the strength of echo from weak targets. Each of these circuits produces the desired results at the expense of receiver sensitivity.

Heretofore, some or all of the above-listed circuits have been connected in the receiver and associated circuits of the radar so as to be used constantly and throughout the entire scanning operation. As a result, the general efficiency of the radar has been substantially reduced since the interference effects, as well as the other phenomena sought to be compensated do not, as a rule, occur throughout the entire sector scanned but only in a limited portion thereof. Thus the receiver sensitivity is needlessly reduced during those parts of the scanning cycle in which the interference effects are absent.

Accordingly, it is an object of the present invention to provide a search radar wherein the above-described defects are substantially eliminated.

Another object is to provide a search radar having auxiliary interference-minimizing circuits and means for automatically switching said auxiliary circuits into and out of operation during the course of a single scanning cycle.

Another object is to provide a search radar of the above-described character wherein means are provided for automatically switching into operation interference-minimizing circuits during a predetermined part of the entire scanning cycle and automatically switching said circuits out during the other part of the scanning cycle.

These and other objects of the invention and the various features and details of construction and operation thereof are hereinafter more fully set forth and described with reference to the accompanying drawings.

Fig. 1 is a schematic circuit diagram of the present invention,

Fig. 2 is a diagram of the wave form of the invention of Fig. 1 showing the voltage on the control transformer as the antenna rotates through a complete cycle.

The sector selector is primarily a two-stage amplifier including relay circuits, a 3-phase control transformer circuit and switches for selecting the desired auxiliary circuit or circuits to be operative during a predetermined part of the scanning cycle. Said device provides a practical means for automatically operating a relay over a controllable sector of rotation of a rotating system.

A simplified search radar system 11 that has incorporated in it auxiliary circuits to minimize interference and increase the echo signal from weak targets is shown in block form in Fig. 1 connected to the sector selector 13. Said radar system comprises a transmitter 15, a receiver 17, an inverter 19 and an antenna system including an antenna 21 and an antenna drive motor 23 mechanically geared to the rotor 25 of a differential synchrogenerator 27. Operation of the search radar system will be confined to those portions of the system used in conjunction with the sector selector.

As the antenna is rotated radio-frequency signals generated by transmitter 15 are radiated and reflected back by targets to the antenna. Rotor 25 of synchro-generator 27 is geared to the antenna shaft and rotates in unison with the antenna. As the antenna scans, 3-phase synchro (rotational) information is induced in the stator windings by the field of rotor 25. Said rotational information is fed from the outputs of stator 29 to stator 31 of the 3-phase control transformer 33 in the sector selector 13 through isolating resistors (not shown). The voltage on rotor 35 of control transformer 33 will vary as shown in Fig. 2 as the antenna 21 rotates. The position of the maximum voltage points may not necessarily be shown in Fig. 2 since said maximum points are dependent on the setting of rotor 35. It is this fact that enables any sector to be selected by adjusting the position of rotor 35. Selection of a desired sector into which the auxiliary circuits are to be switched is made by rotating rotor 35 by means of a manual control 37 geared to rotor 35.

The voltage signal induced in rotor 35 is fed to the grid 39 of amplifier tube 41. Condenser 43 inserted in the grid-to-cathode circuit of tube 41 improves the waveform of said voltage signal. Resistor 42 is inserted in the cathode circuit of tube 41 to provide the correct negative bias for said tube. Plate voltage for tube 41 is obtained from a suitable B+ supply and supplied to plate 40 of tube 41 through resistor 38. The rotor voltage is amplified by tube 41 and fed to grid 45 of tube 47 through coupling condenser 48. Alternating voltage is supplied to the plate 49 of tube 47 through transformer 50 from inverter 19. Said inverter also supplies excitation voltage to the differential generator 27 of the antenna system. Thus, the signal voltage fed to grid 45 of tube 47 is in phase with the plate voltage of said tube during 180 degrees of the antenna rotation. During the other 180 degrees of the antenna rotation, the aforementioned voltages are out of phase with each other and tube 47 will not conduct, thereby drawing no current. The center of the 180 degree sector is determined by the setting of rotor 35 of control transformer 33. Grid bias for tube 47 can be supplied from a suitable source or from the radar system. Resistor 51 is used to control the grid bias to tube 47 and determines the length of time relay 53 remains energized. If the setting of resistor 51 is for maximum bias, only the maximum signal voltage will cause master relay 53 to close and said relay will remain closed over a narrow sector. With resistor 51 set for minimum bias, sufficient current will be drawn by tube 47 to keep relay 53 closed for a 180 degree sector. (As shown in Fig. 1 relay 53 is in inactuated position.)

Multi-contact relay 55 is a slave relay and is used to operate the various auxiliary circuits incorporated in radar system 11. Said relay is also used to make the selected sector appear in nearly the same place for clockwise and counterclockwise rotation of antenna 21. Normally this does not take place since the pull-in and drop-out currents of relay 53 are unequal (the pull-in being 4 milliamperes, the drop-out being 2 ma.). The addition of condenser 57 and resistor 59 in the plate circuit of tube 47 tend to minimize this error. When relay 53 is actuated armature 61 is closed thereby applying suitable voltage, such as from a battery 63, to the energizing coil of relay 55. Said energizing voltage causes armatures 65, 67, 69 and 71 of relay 55 to close. When armature 65 of relay 55 closes, resistor 59 is inserted in series with the energizing coil of relay 53. Resistor 59 decreases the voltage available to tube 47 and also the current through said tube and through relay 53 causing the desired effect of making relay 53 drop out sooner than under normal operation. Condenser 57 inserted across the coil of relay 53 is used to reduce chatter of said relay.

As relay 53 drops out, armature 61 opens the energizing circuit to relay 55 and armatures 65, 67, 69 and 71 return to unactuated position. Condenser 73, which was charged to —105 volts, D.C. while relay 55 was energized, supplies a pulse of negative voltage through resistor 75 to the grid 45 of tube 47. Said negative voltage pulse is of sufficient value to cut-off tube 47 sharply and cause relay 53 to drop out without chatter. Resistors 77 and 79 limit the maximum and minimum sector widths that can be selected by the sector selector. Said resistors can be shorted-out or eliminated if such limits are not desired.

A number of switches 81, 83, 85, 87 and 89 are incorporated in the sector selector to enable a radar operator to insert one or several of the auxiliary circuits in the radar system when the antenna is scanning. By closing one or several of said switches the auxiliary circuit or circuits are activated by the sector selector and will remain in operation over a sector of scan as determined by the setting of rotor positioner 37 rather than over a complete revolution of antenna 21. Relays 53 and 55 switch on or off such circuits as may be advantageously used over the selected sector of rotation.

From the foregoing it is seen that during a predetermined part of the entire scanning cycle of search radar equipment means are provided for automatically switching into or out of operation interference-minimizing circuits without sacrificing receiver sensitivity in sectors where such interference-minimizing circuits are not required.

While a particular embodiment of the invention has been shown and described herein, it is not intended that the invention be limited to such disclosure, but that changes and modifications can be made and incorporated within the scope of the claims.

I claim:
1. In a search radar detection apparatus including a transmitter, a receiver, an antenna electrically connected to said transmitter and receiver, motor means for rotating said antenna through 360 degrees, a synchro-generator having a rotor and stator, the rotor of said generator being mechanically geared to said motor for rotation in unison with said antenna, an inverter for supplying excitation voltage to said synchro-generator, and a plurality of auxiliary interference-minimizing circuits, means for causing a plurality of said auxiliary interference-minimizing circuits to be operative with said receiver during a predetermined sector of rotation of said antenna comprising a three-phase control transformer having a rotor and stator, the stator of said transformer being connected electrically to the stator of said synchro-generator, means for adjusting the angular position of the rotor of said transformer, means for amplifying the output of said transformer, means for supplying an alternating voltage from said inverter to said amplifying means, and relay means connected to said auxiliary circuits, said relay means being energized by the output of said amplifier means.

2. In a search radar detection apparatus including a transmitter, a receiver, an antenna electrically connected to said transmitter and receiver, motor means for rotating said antenna through 360 degrees, a synchro-generator having a rotor and stator, the rotor of said generator being mechanically geared to said motor for rotation in unison with said antenna, an inverter for supplying excitation voltage to said synchro-generator, and a plurality of auxiliary interference-minimizing circuits, means for causing a plurality of said auxiliary interference-minimizing circuits to be operative with said receiver during a predetermined sector of rotation of said antenna comprising a three-phase control transformer having a rotor and stator, the stator of said transformer being connected electrically to the stator of said synchro-generator, means for adjusting the angular position of the rotor of said transformer, a first amplifier circuit for accepting the voltage signal induced in the rotor of said transformer, a second amplifier circuit for accepting the output of said first amplifier, means for supplying an alternating voltage from said inverter to said second amplifier circuit, and a relay connected to said auxiliary circuits, said relay being energized by the output of said second amplifier circuit.

References Cited in the file of this patent
UNITED STATES PATENTS

| | | |
|---|---|---|
| 2,572,975 | Berger et al. | Oct. 30, 1951 |
| 2,633,568 | Greene | Mar. 31, 1953 |
| 2,639,423 | Sherr | May 19, 1953 |